(12) United States Patent
Helmbold et al.

(10) Patent No.: US 8,474,785 B2
(45) Date of Patent: Jul. 2, 2013

(54) VALVE ASSEMBLY COMPRISING A TORQUE LIMITER

(75) Inventors: Thomas Helmbold, Singen (DE); Ozan Ufuk Topcuogullari, Klettgau (DE); Oliver Trefz, Bonndorf (DE); Joerg Wermelinger, Schaffhausen (CH); Peter Haug, Singen (DE)

(73) Assignee: Georg Fischer Wavin AG, Schaffhausen (CH)

( * ) Notice: Subject to any disclaimer, the term of this patent is extended or adjusted under 35 U.S.C. 154(b) by 281 days.

(21) Appl. No.: 12/670,573

(22) PCT Filed: Jul. 9, 2008

(86) PCT No.: PCT/EP2008/058908
§ 371 (c)(1),
(2), (4) Date: May 24, 2010

(87) PCT Pub. No.: WO2009/019103
PCT Pub. Date: Feb. 12, 2009

(65) Prior Publication Data
US 2010/0224808 A1     Sep. 9, 2010

(30) Foreign Application Priority Data
Aug. 3, 2007   (EP) ..................................... 07113756

(51) Int. Cl.
*F16K 31/44*     (2006.01)

(52) U.S. Cl.
USPC ............................................. 251/81; 251/248

(58) Field of Classification Search
USPC ......................... 251/79, 80, 81, 229, 248, 318
See application file for complete search history.

(56) References Cited

U.S. PATENT DOCUMENTS

| | | | | |
|---|---|---|---|---|
| 1,784,094 | A | * | 12/1930 | Fletcher ........................ 251/229 |
| 4,063,707 | A | * | 12/1977 | Zouzoulas ....................... 251/79 |
| 4,619,437 | A | * | 10/1986 | Williams et al. ................. 251/81 |
| 5,000,721 | A | | 3/1991 | Williams |
| 5,285,951 | A | * | 2/1994 | Dierikx et al. ................. 228/214 |
| 5,941,502 | A | * | 8/1999 | Cooper ...................... 251/129.15 |
| 2005/0104021 | A1 | | 5/2005 | Meyers |
| 2006/0067848 | A1 | * | 3/2006 | Andersen et al. ............ 418/61.3 |
| 2010/0163770 | A1 | * | 7/2010 | Markvart et al. .............. 251/209 |

FOREIGN PATENT DOCUMENTS

| | | |
|---|---|---|
| DE | 4202364 | 7/1993 |
| DE | 4344151 | 6/1995 |
| DE | 19646275 | 5/1998 |
| EP | 1729047 A1 * | 12/2006 |

* cited by examiner

*Primary Examiner* — John K Fristoe, Jr.
*Assistant Examiner* — Reinaldo Sanchez-Medina
(74) *Attorney, Agent, or Firm* — Bachman & LaPointe, P.C.

(57) ABSTRACT

A valve assembly (1) comprising a valve housing (2), a stem (4) that is disposed perpendicular to the direction of flow within the valve housing (2), and a blocking member (3) which can be movably connected to the stem (4). The stem (4) is provided with a device (5) for limiting torque.

12 Claims, 6 Drawing Sheets

VALVE ASSEMBLY COMPRISING A TORQUE LIMITER

BACKGROUND OF THE INVENTION

The invention relates to a valve assembly comprising a valve housing with a valve seat, a spindle which is arranged in the valve housing, the spindle being arranged perpendicularly with respect to the flow direction, and a shutoff element which can be connected movably to the spindle and has a sealing element.

In pipeline construction, different valve designs are used in order to shut off pipelines which are pressurized and carry medium. Different factors play an important role in the selection of the valve design: the sealing action between the valve seat and the sealing element, the coefficient of resistance of the valve, the dimensions and the production costs of the valve.

DE 196 46 275 A1 has disclosed a valve, in which the valve spindle is arranged so as to extend perpendicularly with respect to the flow direction. The shutoff element and the sealing element are arranged at two different angles to the flow direction. The actual sealing element, an O-ring, is integrated into the valve housing on its outer circumferential face. The axes of the inflow and outflow lines are arranged offset with respect to one another, which leads to a higher coefficient of resistance. More than half the annular circumferential face lies free and is exposed to the flowing medium when the valve is open. The sealing action of the O-ring is not distributed uniformly over the entire circumference. The O-ring is loaded and deformed in an upper region above all in the direction of the O-ring axis. In a lower region the O-ring is loaded and deformed above all in the radial direction.

Proceeding from this prior art, it is an object of the invention to specify a valve assembly which can be produced simply and compactly from as few individual parts as possible and ensures as satisfactory a sealing action as possible.

SUMMARY OF THE INVENTION

The foregoing object is achieved by a valve assembly comprising a valve housing with a valve seat, a spindle which is arranged in the valve housing, the spindle being arranged perpendicularly with respect to the flow direction, and a shutoff element which can be connected movably to the spindle and has a sealing element, characterized in that the spindle has an apparatus for limiting the torque.

It is advantageous that the valve assembly is corrosion-resistant and functions reliably over a very long time. This is achieved by the fact that the apparatus for limiting the torque is formed from a first cage region which is operatively connected to the spindle and from a second disk region which is operatively connected to an actuating apparatus. The cage region and the disk region are formed completely from plastic. Metal springs or other individual parts which make the assembly of the valve assembly complicated or corrode are not used.

It is also advantageous that the coefficient of resistance of the valve is kept as low as possible and thus the pressure loss in the pipeline is kept as small as possible. This is achieved by the fact that the first lower housing region has a T-shaped cross section, the axes of the inflow and outflow lines being arranged in one line.

It is also advantageous that the sealing action is distributed as uniformly as possible on the entire sealing element. This is achieved by the fact that a sealing element which is formed obliquely with respect to the flow direction and so as to correspond to the inclined slope of the valve seat is arranged on the shutoff element.

BRIEF DESCRIPTION OF THE DRAWINGS

One exemplary embodiment of the invention will be described using the figures, in which.

DETAILED DESCRIPTION

Figure 1:
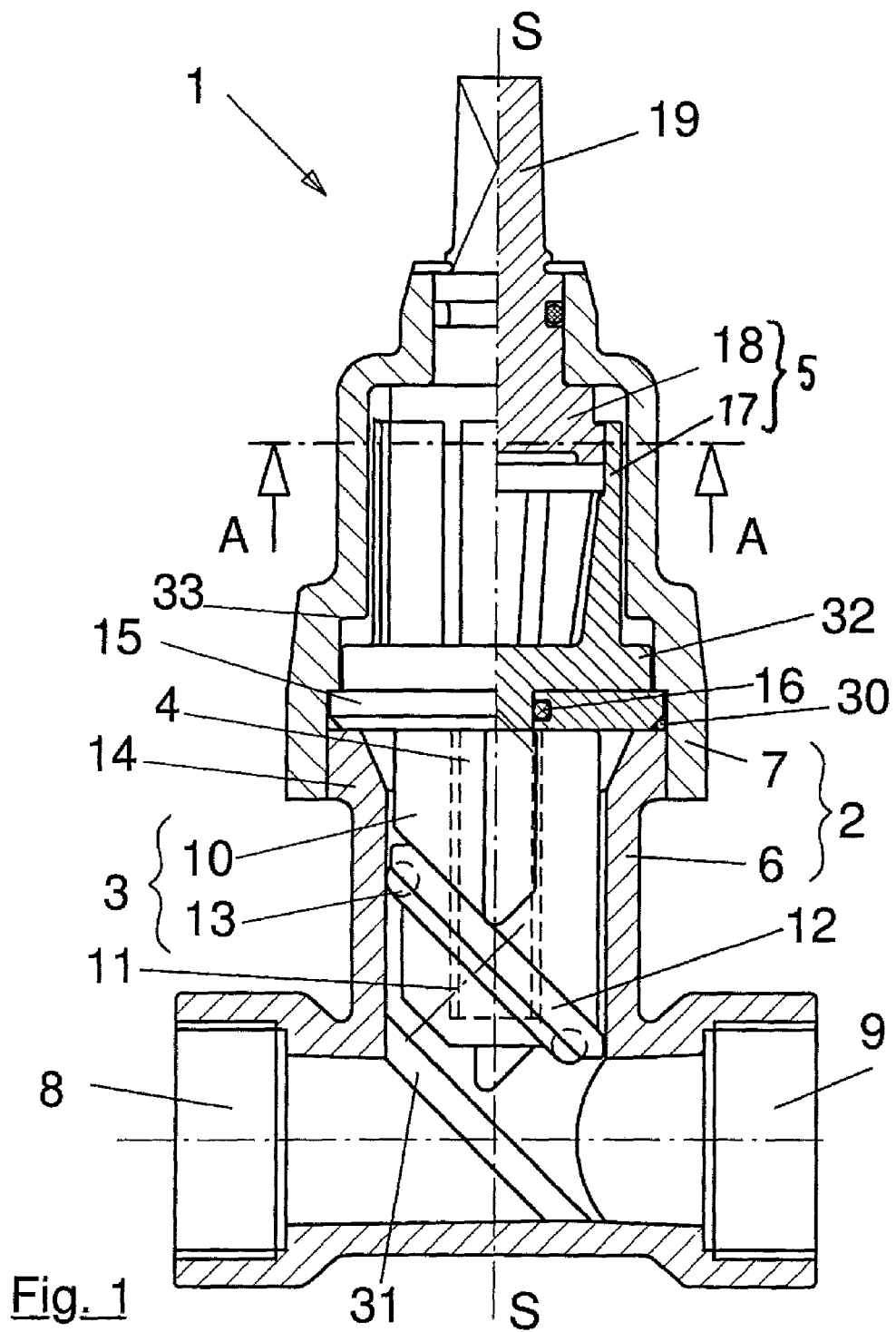
FIG. 1 shows a section through a valve assembly according to the invention in the completely open state.
Figure 2:
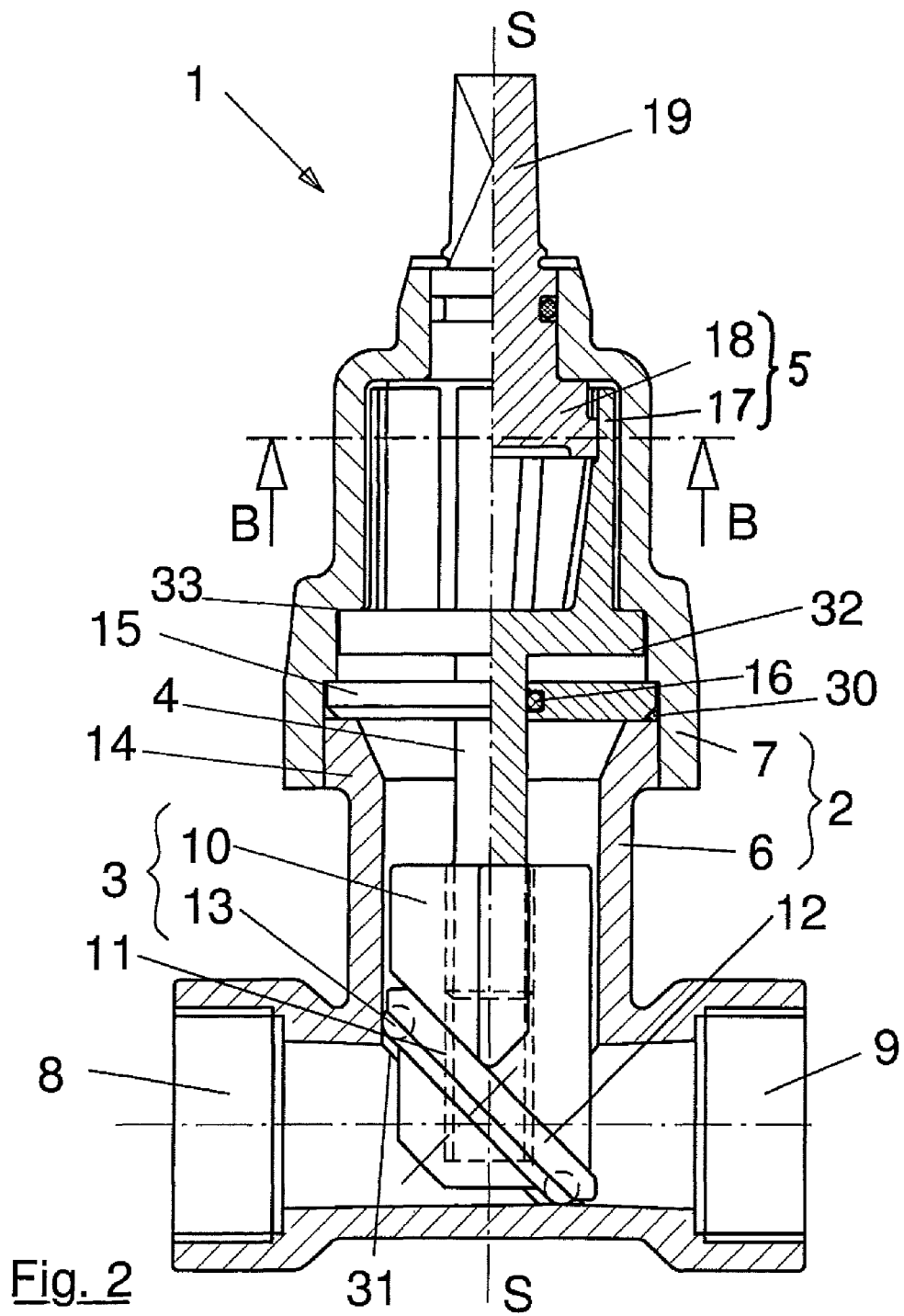
FIG. 2 shows a section through the valve assembly of FIG. 1 in the completely closed state.

FIG. 1 and FIG. 2 show sections through a valve assembly 1 with a valve housing 2, a shutoff element 3, a spindle 4 for actuating a shutoff element 3, and an apparatus 5 for limiting the torque which occurs during the actuation of the spindle 4. The valve housing 2 comprises a first lower housing region 6 and a second upper housing region 7. The valve assembly 1 is produced completely from plastic parts, that is to say from corrosion-resistant parts. A lifting valve 1 is shown here as an exemplary embodiment of the valve assembly 1; according to the invention, all other valve designs, a spindle 4 being used, can also be equipped with an apparatus 5 for torque limitation.

The first housing region 6 is of substantially T-shaped configuration and has two connecting regions 8, 9 for connection to the inflow and outflow lines (not shown here) which carry medium. The axes of the inflow and outflow lines are arranged in a line. This achieves a situation where, when the valve is open, the medium can flow through the valve 1 as far as possible without resistance. The shutoff element 3 is substantially a cylindrical plunger 10 with an internal thread 11 which interacts with a matching thread on the spindle 4. A rotation of the spindle 4 in the clockwise direction causes the plunger 10 to move perpendicularly downward in the valve housing 2 and the valve to be closed. A rotation in the counterclockwise direction likewise causes the plunger 10 to be raised and the lifting valve 1 to be opened.

A commercially available O-ring is inserted as actual sealing element 13 in a groove 12 which is formed obliquely, that is to say at an angle with respect to the spindle axis S, on the outer circumference of the plunger 10. The groove 12 is configured so as to match the O-ring 13 and in the process encloses the O-ring 13 over a large part of the circumference, for example from more than 270° to over 300°, of the O-ring 13. This achieves a situation where, during opening of the valve, the O-ring 13 cannot be flushed out of the groove 12 even at high flow speeds. A valve seat 31 is formed in the lower housing region 6 between the connecting regions 8, 9 perpendicularly below the spindle 4, the valve seat 31 being arranged at the same angle as the O-ring 13 with respect to the spindle axis S.

The second upper housing region 7 is fastened to a shoulder or a flange 14 of the first lower housing region 6 by a screw connection or a welded connection. An intermediate plate 15 can be seen between the end side of the flange 14 and the neck of the upper housing region 7. The intermediate plate 15 serves firstly during opening of the shutoff element 3 as stroke travel limiting means of the plunger 10 and secondly as guide for the spindle 4. The spindle 4 extends through a central hole of the intermediate plate 15.

For sealing purposes, a further groove 16 for an O-ring seal can be seen in the central hole. The seal between the spindle 4 and the intermediate plate 15 is arranged at the smallest possible diameter in order to keep the forces which act on said seal as low as possible. The lower housing region 6, through which the medium flows, is sealed with respect to the upper housing region 7 by way of an additional O-ring seal in a receptacle 30 between the lower housing region 6 and the intermediate plate 15.

The upper end of the spindle 4 is configured as a cage region 17. A disk region 18 which is formed at the lower end of an actuating rod 19 engages into the cage region 17. The disk region 18 has a toothing system 20 on the outer circumference and the cage region 17 has a further mating toothing system 21 on the inner circumference, which toothing systems 20, 21 are in engagement with one another during normal operation of the lifting valve 1. The torque securing of the lifting valve 1 is achieved by the division in two of the valve actuation: the actuating rod 19 with the disk region 18 at the lower end and the spindle 4 with the cage region 17 at the upper end.

FIG. 1 shows the lifting valve 1 in the completely open state and FIG. 2 shows the lifting valve 1 in the completely closed state. When the lifting valve 1 is opened completely, the cage region 17 is displaced downward with respect to the actuating rod 19 with the disk region 18 until the spindle 4 rests with the cage region on the intermediate plate 15. Likewise, when the lifting valve 1 is closed completely, as shown in FIG. 2, the cage region 17 is displaced upward with respect to the disk region 18.

Figure 3:
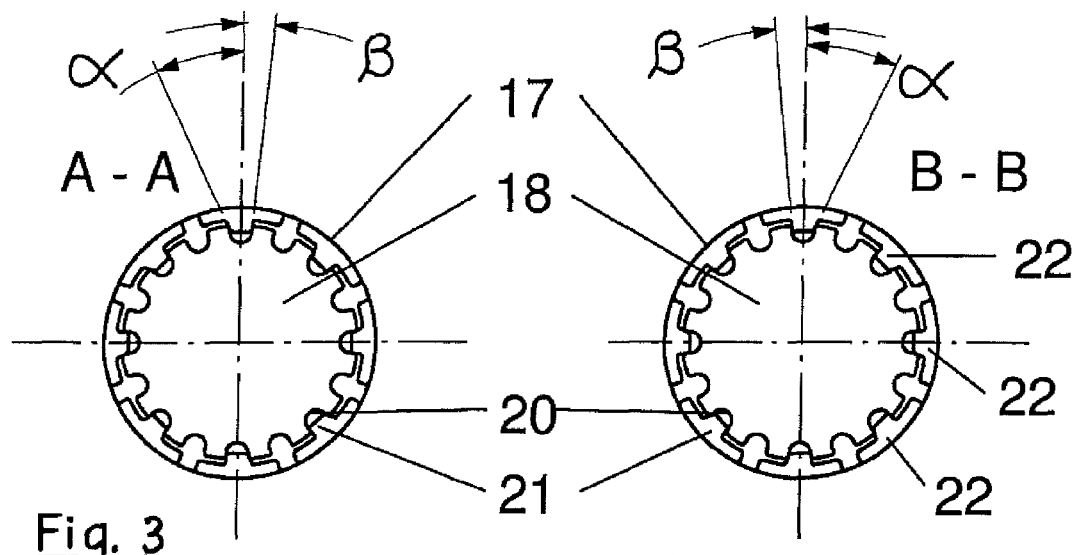
FIG. 3 shows a section through an apparatus for limiting the torque in the valve from FIG. 1.
Figure 4:
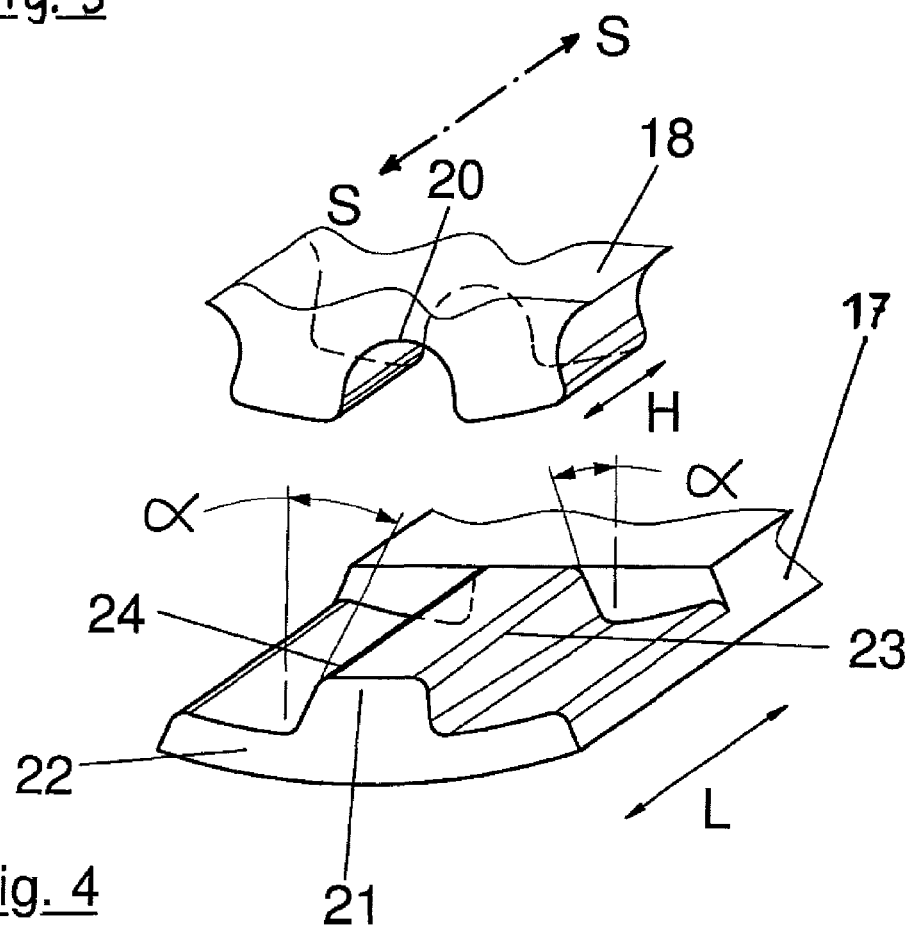
FIG. 4 shows a perspective view of the apparatus for limiting the torque in the valve from FIG. 1.

It can be seen in FIGS. 3 and 4 how the toothing system 20, 21 is formed. The cage region 17 is formed as a ring of a plurality of, for example eight, radially resilient wall regions 22. At least one toothing system 21 which engages into a matching mating toothing system 20 on the circumference of the disk region 18 can be seen on each wall region 22. If the permissible torque of the rotational movement of the spindle 4 is exceeded, the wall regions 22 yield radially outward with the teeth 21 and no longer forward the force which is exerted on the actuating rod 19 and on the disk region to the cage region 17, to the spindle 4 and to the shutoff element 3.

In the case of an individual wall region 22 of the cage region 17 with a tooth 21, FIG. 4 shows, on an enlarged scale and in perspective, as viewed in the direction of the spindle axis S, a detail of the disk region 18 with a mating toothing system 20. The length L of the tooth 21 is greater than the height H of the disk region 18. The mating toothing system 20 can therefore be displaced axially in the direction of the spindle axis S and remains in engagement with the tooth 21 in the process.

The tooth 21 has two tooth flanks 23, 24 with different flank angles $\alpha$, $\beta$. A flank angle $\alpha$ which is flatter than the angle of the mating toothing system 20 has the result that the contact face between the tooth 21 and the mating toothing system 20 is smaller, and that the teeth 20, 21 can slide away over one another under the action of force which is exerted by the rotational movement of the spindle 4. If the flank angle $\beta$ of the tooth 21 is the same size as the flank angle of the mating toothing system 20, the contact face between the teeth 20, 21 is larger and the force which is transmitted is likewise larger. This means that a greater force can be transmitted in the case of a rotational movement in one direction than in the opposite direction.

It can also be seen in FIG. 4 how the flank angles $\alpha$, $\beta$ change continuously with the length L of the tooth 21 in the wall region 22. At the end of the wall region 22, the tooth flanks 23, 24 have in each case the flank angles $\alpha$, $\beta$ to the tooth flanks 23, 24 which lie opposite in each case. The continuous transition from a greater flank angle $\alpha$ to a smaller flank angle $\beta$ on the side of the first tooth flank 23 and the simultaneous transition of the flank angles from $\beta$ to $\alpha$ on the side of the second tooth flank 24 achieve a situation where there is a slipping coupling, or a limitation of the torque, at both ends of the rotational movement, that is to say in the first and in the second end positions of the lifting valve 1. The flank angle $\beta$ is substantially smaller than the flank angle $\alpha$, it also being possible for the flank angle $\beta$ to be 0°.

Figure 5:
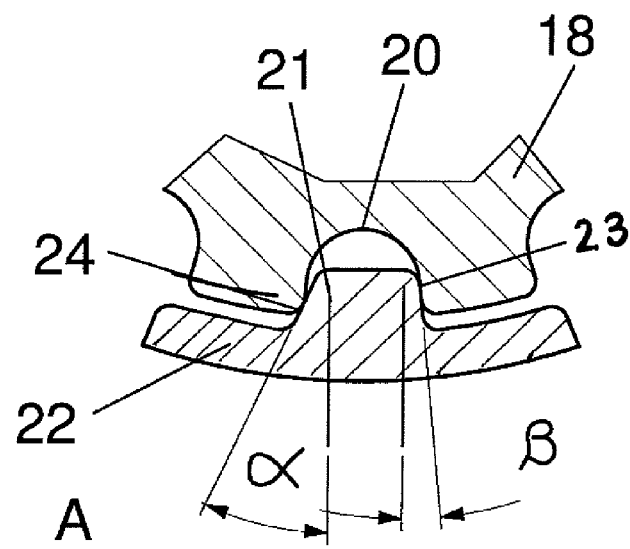
FIG. 5 shows a section through the apparatus for limiting the torque in the valve from FIG. 1 in the completely open state.
Figure 6:
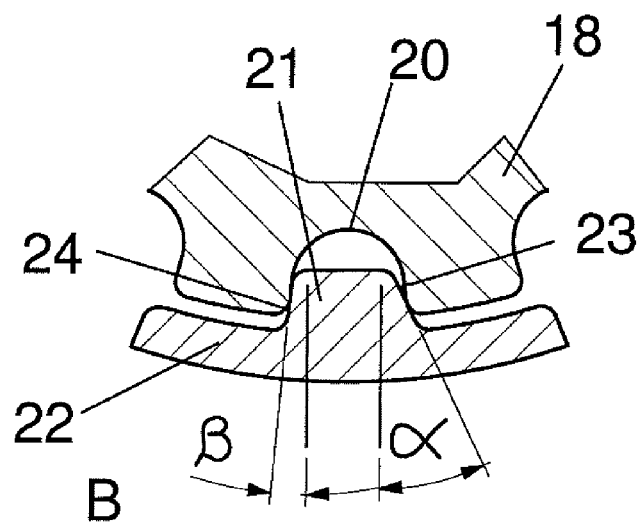
FIG. 6 shows a section through the apparatus for limiting the torque in the valve from FIG. 1 in the completely closed state.

FIGS. 5 and 6 show sections of the toothing systems 20, 21. FIG. 5 shows the position of the disk region 18 and the cage region 17 in the completely open state of the lifting valve 1, and FIG. 6 shows the corresponding position in the completely closed state. The section from FIG. 5 is indicated in FIG. 1 with the line A-A, and the section from FIG. 6 is indicated in FIG. 2 with the line B-B. In the completely open state of the lifting valve 1 (FIG. 1), the cage region 17 of the spindle 4 rests with a base plate 32 on the intermediate plate 15 and the disk region 18 is situated at the upper end of the cage region 17. In the completely closed state of the lifting valve 1 (FIG. 2), the base plate 32 of the cage region 17 of the spindle 4 rests on a shoulder 33 in the upper housing region 7 and the disk region 18 is situated at the upper end of the cage region 17.

Figure 7:
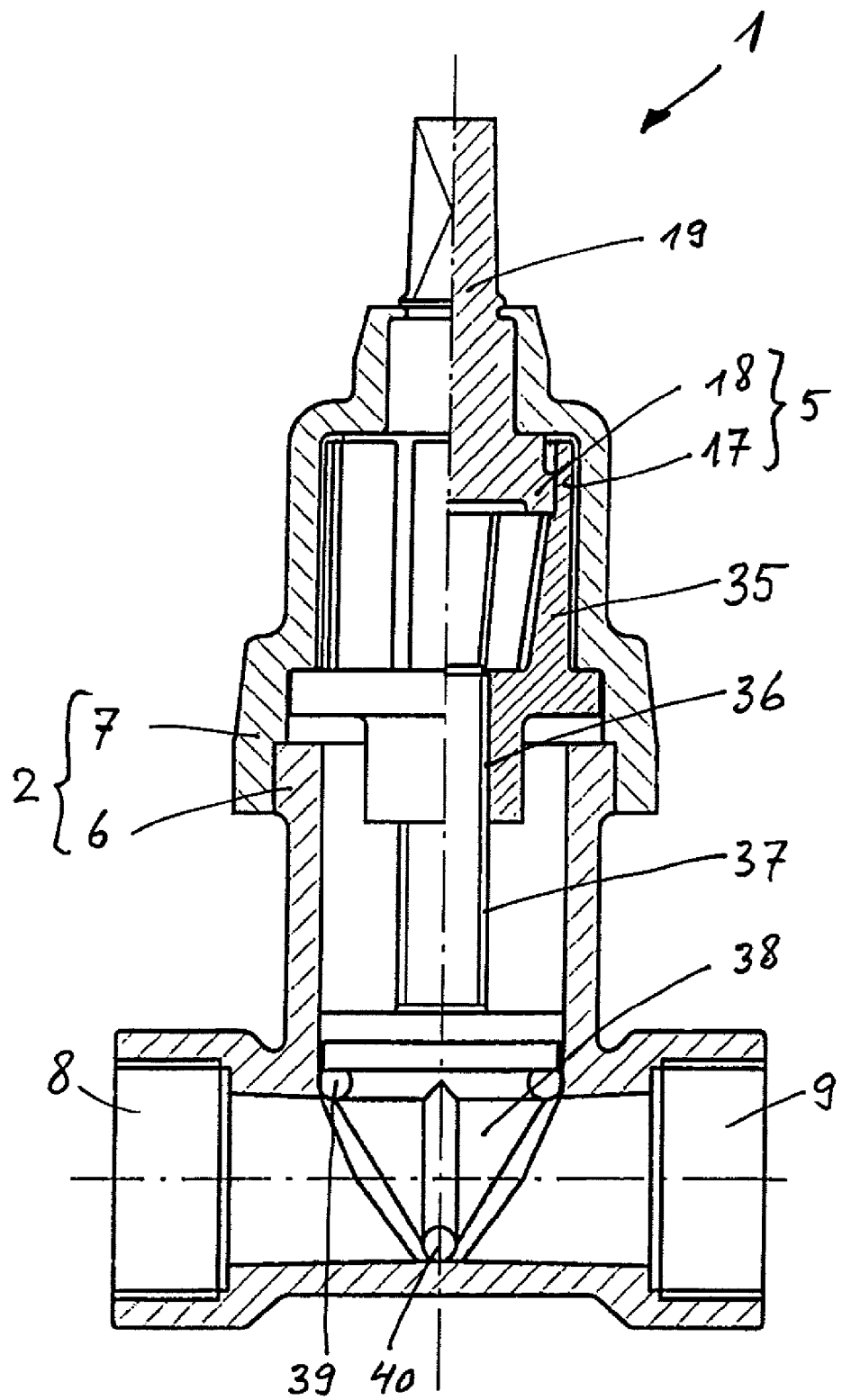
FIG. 7 shows a section through a further valve with an apparatus for limiting the torque in the completely closed state.
Figure 8:
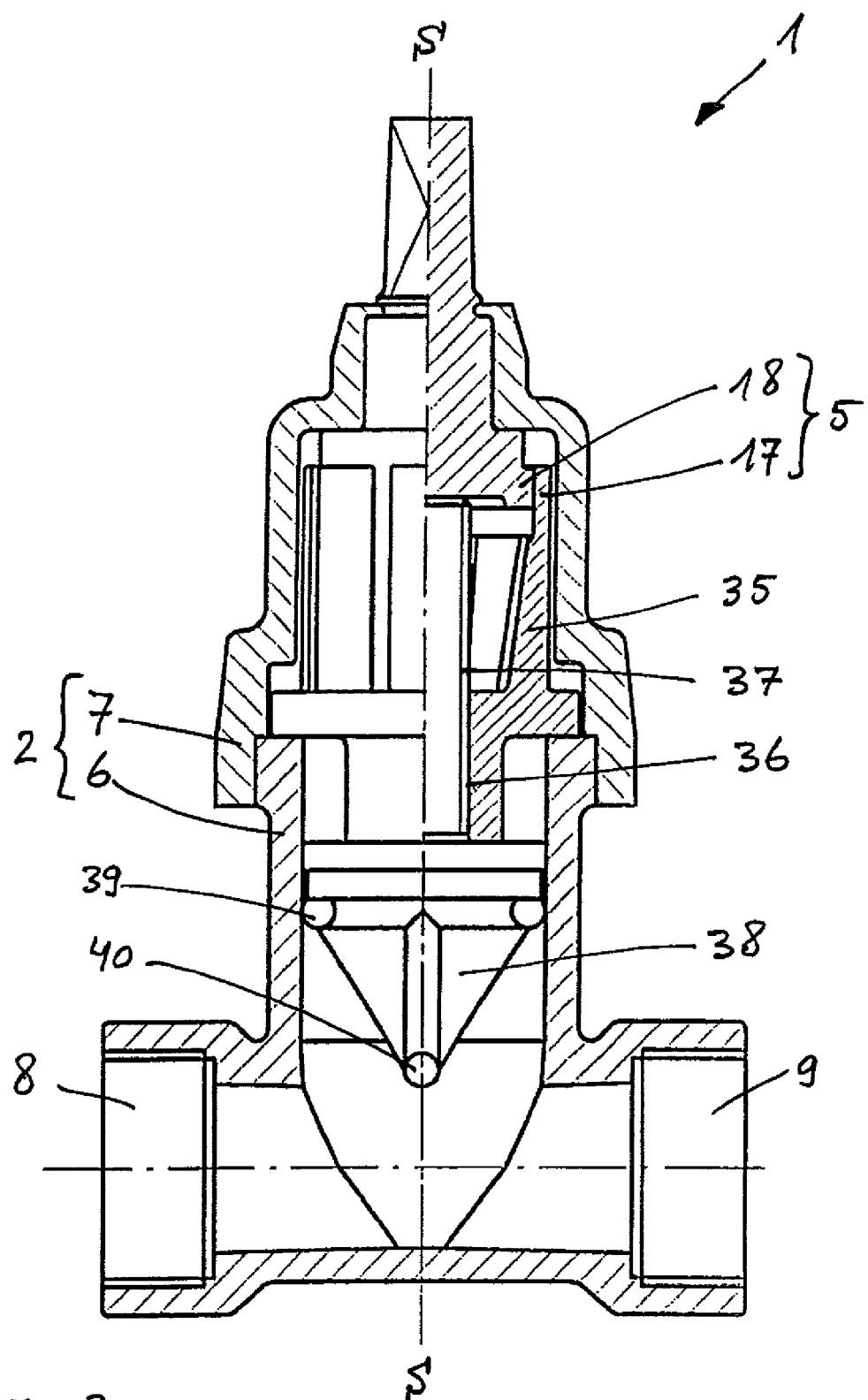
FIG. 8 shows a section through the valve of FIG. 7 with an apparatus for limiting the torque in the completely closed state.

FIGS. 7 and 8 show a further exemplary embodiment of a valve assembly 1 with an apparatus 5 for limiting the torque. Here, the apparatus 5 for limiting the torque, as in FIGS. 1 and 2, comprises a disk region 18 which is formed at the lower end of the actuating rod 19. The disk region 18 has a toothing system 20 which is formed at the upper end of an intermediate piece 35 with a mating toothing system 21 on a radially resilient cage region 17. At the lower end, the intermediate piece 35 has a threaded region 36, in which a spindle 37 is arranged.

The spindle 37 is formed in one piece with the shutoff element 38. Sealing apparatuses 39, 40 are formed on the shutoff element 38. The sealing apparatuses 39, 40 can be inserted into the mold of a plastic injection molding device and can be encapsulated or coated with the plastic of the shutoff element 38. The sealing apparatuses 39, 40 are produced, for example, from a thermoplastic elastomer and are coated with the polyethylene composition of the shutoff element 38. An intermediate plate 15, as in FIGS. 1 and 2, can be omitted. The overall height of the valve assembly of FIGS. 7 and 8 is substantially lower than the overall height of the valve assembly of FIGS. 1 and 2. As a result, the use of a valve 1 with torque limitation 5 is possible even in the case of reduced space conditions. The valve assembly from FIGS. 7 and 8 which is constructed only from five individual parts is of substantially simpler construction than the valve assembly from FIGS. 1 and 2.

The assembly which is proposed here affords a torque limiting means 5 which provides the same security against overloading both in the closed and in the open state. All the parts are produced from plastic and no balls are required which are difficult to handle and which jam after a relatively long time. A metal spring which loses the spring force and/or corrodes after a relatively long time is not required either. A very compact design with as few individual parts as possible can be achieved because the spring action is integrated into the plastic component of the cage region 17. The spindle 4 with the torque limiting means 5 has only an insubstantially greater diameter than the actual shutoff element 3.

The lifting valve 1 is used, above all, in water lines which are laid underground. The lifting valve 1 does not have to be actuated very often here. Even after a relatively long unactuated time, the lifting valve 1 still absorbs the forces which are necessary for a correct actuation. The torque limiting means 5 shown here and comprising a disk region 18 and a cage region 17 can also be used in other valve designs and in other objects, in which torque limitation is required.

The invention claimed is:

1. A valve assembly comprising a valve housing, a spindle which is arranged in the valve housing, the spindle being arranged perpendicularly with respect to a flow direction, and a shutoff element which is movably connected to the spindle, wherein the spindle has an apparatus for limiting torque, the apparatus for limiting torque comprises a cage region which is operatively connected to the spindle and a disk region which is operatively connected to an actuating apparatus, the cage region and the disk region have mating toothing systems which are matched to one another, and wherein the toothing system of the cage region has tooth flanks with flank angles $\alpha$ and $\beta$ of different configuration, the flank angles $\alpha$ and $\beta$ change continuously and a flank angle $\alpha$ plus flank angle $\beta$ remains constant during the axial movement of the cage region perpendicularly with respect to the flow direction and relative to the disk region.

2. The valve assembly as claimed in claim 1, wherein the valve housing comprises a first lower housing region which accommodates the shutoff element and through which the medium flows, and a second upper housing region which accommodates the apparatus for limiting torque.

3. The valve assembly as claimed in claim 2, wherein the first lower housing region has a T-shaped cross section and axes of inflow and outflow lines are arranged in one line.

4. The valve assembly as claimed in claim 1, wherein a sealing element formed obliquely with respect to the flow direction is arranged on the shutoff element and corresponds to an inclined slope of a valve seat.

5. The valve assembly as claimed in claim 1, wherein the cage region is rotatable about an axis of the spindle relative to the disk region and is displaced in the direction of the spindle axis (S).

6. The valve assembly as claimed in claim 1, wherein the toothing system of the cage region is of radially resilient configuration.

7. The valve assembly as claimed in claim 1, wherein the toothing system of the cage region has a length (L) which is longer than a height (H) of the toothing system of the disk region.

8. The valve assembly as claimed in claim 1, wherein the cage region and the disk region are formed from plastic.

9. The valve assembly as claimed in claim 1, wherein the valve assembly is configured as a lifting valve.

10. The valve assembly as claimed in claim 1, wherein the cage region of the spindle comprises a base portion which limits the axial movement of the cage region.

11. The valve assembly as claimed in claim 10, wherein the valve housing comprises a lower housing region which accommodates the shutoff element and an upper housing region which accommodates the base portion wherein the base portion limits the axial movement of the cage region between a first position defined by a shoulder on the upper housing and a second position defined by an intermediate plate through which the spindle extends.

12. The valve assembly as claimed in claim 11, wherein the intermediate plate is sealed in a space defined by the upper housing and the lower housing.

* * * * *